(12) United States Patent
    Aldrey

(10) Patent No.: US 8,904,432 B2
(45) Date of Patent: Dec. 2, 2014

(54) METHOD AND APPARATUS FOR PROVIDING DISPLAYABLE APPLICATIONS

(75) Inventor: Raul Aldrey, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 589 days.

(21) Appl. No.: 11/966,221

(22) Filed: Dec. 28, 2007

(65) Prior Publication Data

US 2009/0217320 A1    Aug. 27, 2009

(51) Int. Cl.
  *G06F 3/00* (2006.01)
  *G06F 13/00* (2006.01)
  *H04N 5/445* (2011.01)
  *H04N 21/478* (2011.01)
  *H04N 21/81* (2011.01)
  *H04N 21/472* (2011.01)
  *H04N 21/45* (2011.01)
  *H04N 21/431* (2011.01)
  *H04N 21/443* (2011.01)
  *H04N 21/462* (2011.01)

(52) U.S. Cl.
  CPC ......... *H04N 5/44513* (2013.01); *H04N 21/478* (2013.01); *H04N 21/8173* (2013.01); *H04N 21/472* (2013.01); *H04N 21/4524* (2013.01); *H04N 21/4318* (2013.01); *H04N 21/47202* (2013.01); *H04N 21/4438* (2013.01); *H04N 21/4622* (2013.01)
  USPC .................. 725/37; 725/40; 725/43; 725/47; 725/131; 715/716

(58) Field of Classification Search
  USPC .................. 715/716; 725/37, 40, 43, 141
  See application file for complete search history.

(56) References Cited

U.S. PATENT DOCUMENTS

| | | | |
|---|---|---|---|
| 7,124,424 B2 * | 10/2006 | Gordon et al. ................... | 725/43 |
| 2002/0078453 A1 * | 6/2002 | Kuo ................................ | 725/46 |
| 2004/0003402 A1 * | 1/2004 | McKenna, Jr. ................... | 725/46 |
| 2007/0083908 A1 * | 4/2007 | McCarthy et al. ............. | 725/112 |
| 2008/0092168 A1 * | 4/2008 | Logan et al. ..................... | 725/44 |
| 2008/0134250 A1 * | 6/2008 | Liu et al. ......................... | 725/46 |
| 2008/0276279 A1 * | 11/2008 | Gossweiler et al. ............. | 725/46 |
| 2010/0306792 A1 * | 12/2010 | Li et al. ........................... | 725/23 |
| 2011/0066958 A1 * | 3/2011 | Littrell .......................... | 715/753 |

* cited by examiner

*Primary Examiner* — Nnenna Ekpo

(57) ABSTRACT

An approach is provided for presenting, via a set-top box, a displayable application providing content (e.g., community content) that is generated based on information corresponding to a user of the set-top box. The displayable application is overlay on video content of the set-top box.

36 Claims, 9 Drawing Sheets

METHOD AND APPARATUS FOR PROVIDING DISPLAYABLE APPLICATIONS

BACKGROUND INFORMATION

With the advent of computers, interactive electronic communications, and the Internet, as well as advances in the digital realm of consumer information, has come a reinvention of conventional entertainment and communication services to enhance programming, recording, and viewing of multimedia, such as broadcast television programs. Traditionally, broadcast media, being based on pre-computer age technology, has developed on its own path, without any regard to other media systems. However, with readily available, cost-effective broadband services, bandwidth intensive applications, such as video streaming, have become viable alternatives to legacy broadcast systems.

It is recognized that modern lifestyles have become so reliant on digital interfaces that media devices, such as set-top boxes (STB), are developing into important iconographies of media content accessibility. As such, an increasing number of individuals are utilizing STBs to achieve the advantages of ubiquitous access to information. Advances in technology, services, and affordability can be better applied to foster the enrichment of communities.

For example, local governments have the opportunity to produce community-initiated programming to address local issues and concerns. Suppliers of multimedia services (such as cable television suppliers) provide local governments a forum for individuals to televise viewpoints, content, events, and other matters of local interest, via dedicated public, educational, and governmental (PEG) access channels. These PEG channels have also been made available to school systems for providing educational programming, and to local governments for televising public hearings, or making accessible other information of interest to local residents. Traditionally, there has been no or very little effort to "modernize" access to such information.

Therefore, there is a need for an approach for seamlessly integrating broadcast and digital content.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for presenting displayable applications providing overlay content that is generated based on information corresponding to a user are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although the various exemplary embodiments are described with respect to a set-top box (STB), it is contemplated that these embodiments have applicability to any device capable of processing video signals for presentation to a user, such as a home communication terminal (HCT), a digital home communication terminal (DHCT), a stand-alone personal video recorder (PVR), a television set, a digital video disc (DVD) player, a video-enabled phone, a video-enabled personal digital assistant (PDA), and/or a personal computer (PC), as well as other like technologies and customer premises equipment (CPE).

Figure 1:
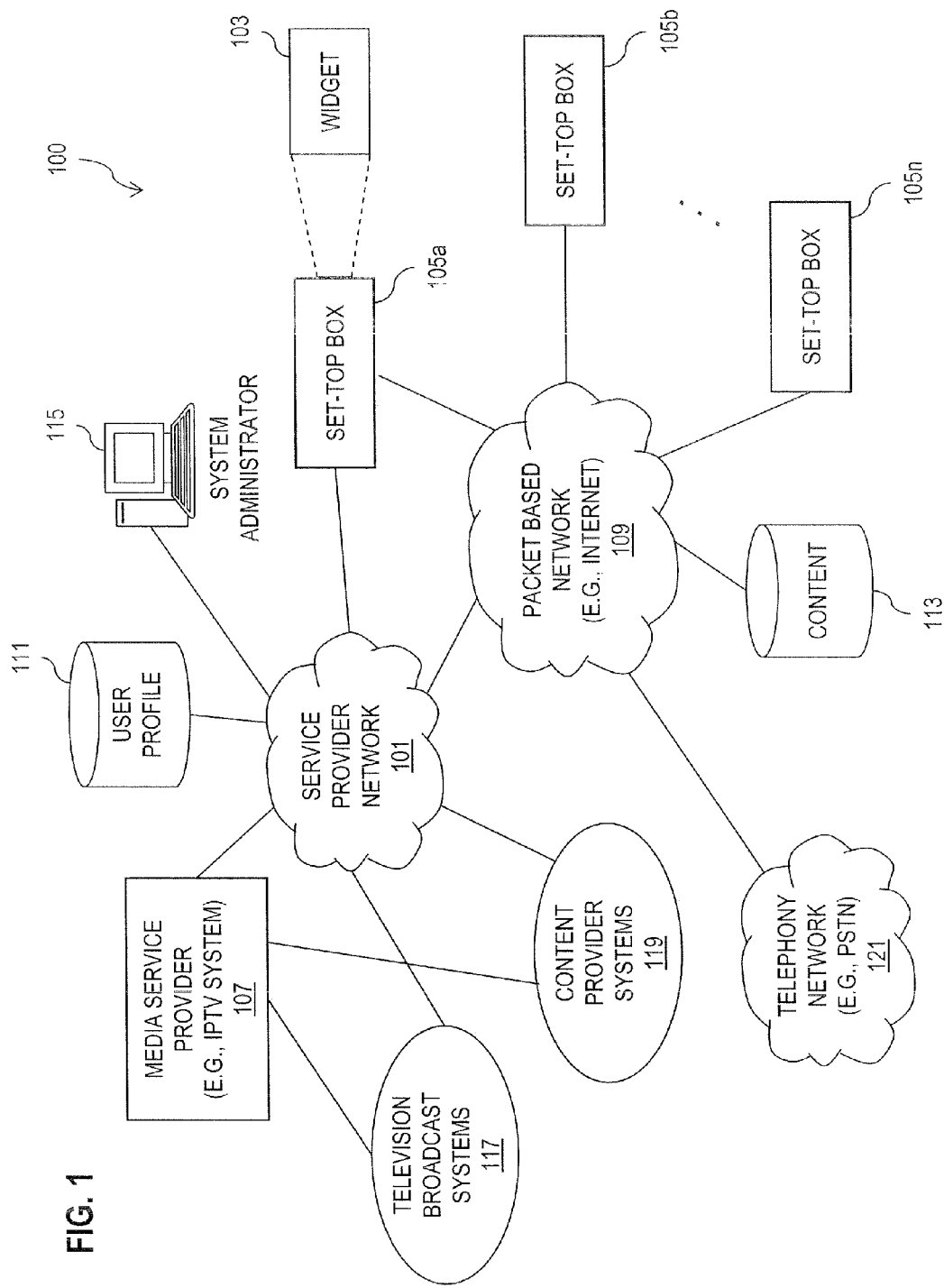
FIG. 1 is a diagram of a system capable of providing widgets in a video broadcast, according to an exemplary embodiment.

FIG. 1 is a diagram of a system capable of providing widgets in a video broadcast, according to an exemplary embodiment. A system 100 can be configured to display applications (e.g., widgets) that provide overlay content (e.g., sports coverage, weather forecasts, traffic reports, horoscopes, daily news, commentary, community service information, etc.) on video media based on information corresponding to a user of a STB, such as geographic or demographic user information. In this manner, a subscriber of the overlay content service may seamlessly obtain current information concerning one or more localities. It is contemplated that system 100 may embody many forms and include multiple and/or alternative components and facilities.

It is observed that digital media formats are increasing in popularity among individuals seeking the most up-to-date, local information regarding sports coverage, weather forecasts, traffic reports, horoscopes, daily news, commentary, or community service information. To satisfy their demand, these individuals are ever increasingly turning to specialized television programs and/or the Internet to find this information. The approach, according to certain embodiments, stems from the recognition that information seekers may benefit from an enhanced body of information, while appreciating the necessity to alleviate the associated burdens, expenses, and inefficiencies of providing dedicated and disparate sources.

Traditionally, cable television systems have attempted to provide local governments a forum for individuals to televise viewpoints, content, events, and other matters of local interest, via dedicated public, educational, and governmental (PEG) access channels. However, the provision of PEG channels has come with significant drawbacks, such as funding, allocating time between competing applicants, and training users on local cable systems and devices. Moreover, PEG channels often inefficiently consume large amounts of network bandwidth, generally for relatively low-bandwidth communications. As such, PEG channels are often under funded and/or understaffed, resulting in poor production quality, poor scheduling and playback, programming that is played late or not at all, or programming with weak signal strength such that the content becomes indiscernible.

Furthermore, conventional distribution techniques have generally focused on repeated broadcasts wherever PEG programming is available. While some viewers may benefit from viewing flexibility in terms viewing opportunity, more individuals become frustrated waiting for the information they desire. Also, because broadcast rotations generally take a significant amount of time to cycle, the information contained therein often becomes dated. Additionally, because of the time lapse between a community group acquiring the information, providing it to a network operator to be formatted onto the operator's equipment, and display, the information may even become obsolete before it is ever viewed. Currently, little attention has been afforded to extending and enhancing the distribution of localized information within the entertainment arena and among other commutations media. Moreover, existing services are not effectively accounting for the urgency of viewers to receive the most current information from a diversity of sources. Thus, it is apparent that current systems are becoming as ineffective, as they are inefficient.

As seen in FIG. 1, it is noted that television remains the prevalent global medium for entertainment and information as individuals spend a great deal of time tuning into televised media. Accordingly, the service provider network 101 of system 100 integrates this medium with that of the telecommunications, computing, and media environments, thereby broadening the scope of devices and sources available to individuals for receiving concurrent, neoteric information. In this manner, system 100 relieves network operators from the burden and expense of providing dedicated PEG channels, by enabling users via user equipment, to automatically locate and receive content, such as sports coverage, weather forecasts, traffic reports, horoscopes, daily news, commentary, or community service information, in displayable overlay applications (e.g., widget 103). Although the user equipment is described with respect to a STB, it is contemplated that the various embodiments have applicability to any device capable of processing video streams. As used herein, "community content" refers to information that is of a public service nature and may be of interest to a community or group of users within a predefined locality—e.g., PEG content.

In a typical scenario, an individual (e.g., a subscriber of the content overlay service) may tune into a televised media program using an STB 105a, while retaining the ability to stay informed with sports, weather, traffic, horoscope, daily news, commentary, and community service information specific to their environment via an informational widget 103. Moreover, service provider network 101 can enable individuals utilizing STBs 105a-105n to interact with one another, in one embodiment, through personalized communications channels utilizing, for instance, a communicational widget 103, e.g., a displayable application enabling short messaging capabilities or voice application capabilities. In other instances, widget 103 can convey proprietary information to the service provider, such as an available content line up or service subscription options.

In the depicted embodiment, a plurality of STBs 105a-105n are configured to communicate with and receive signals and/or data streams, e.g., media content including at least one content overlay instance, from a media service provider (MSP) 107 or other transmission facility. STBs 105a-105n can be located at one or more user sites that are geographically associated with one or more continents, countries, states, counties, municipalities, localities, communities, etc. Exemplary MSPs 107 may comprise one or more media content servers (not illustrated) and/or data repositories. Alternatively, the servers and/or repositories may be accessed via one or more service provider networks 101 or packet-based networks 109, such as user profile repository 111 or content repository 113. Further, a service provider network 101 may include a system administrator 115 for operational and management functions to deploy the media content services using, for instance, an internet protocol television (IPTV) system. In this manner, STBs 105a-105n may utilize any appropriate technology to draw, receive, or transmit media content (including content overlays) from/to an MSP 107 or other content source/sink. A more detailed explanation of an exemplary STB will be provided with respect to FIG. 2.

Media content generally includes audio-visual content (e.g., broadcast television programs, video-on-demand programs, pay-per-view programs, IPTV feeds, DVD related content, etc.), pre-recorded media content, data communication services content (e.g., commercials, advertisements, videos, movies, songs, images, sounds, etc.), Internet services content and/or other equivalent media forms. In this manner, an MSP 107 may provide (in addition to their own media content) content obtained from sources, such as one or more television broadcast systems 117, one or more third-party content provider systems 119, content residing in a repository 113 or server (not illustrated) accessible over a packet-based network 109, or available via one or more telephony networks 121, etc.

Exemplary embodiments enable MSPs 107 to transmit and/or interlace overlay content with conventional media content streams. In alternative embodiments, STBs 105a-105n may be concurrently configured to draw/receive/transmit media content from (or to) multiple sources, thereby alleviating the burden on any single source, e.g., MSP 107, to gather, supply, or otherwise meet the content demands of any user or site. Thus, particular embodiments enable authenticated third-party content provider systems 119 to transmit overlay content data to STBs 105a-105n either apart from, or in conjunction with, MSP 107.

Overlay content may include, but is certainly not limited to, information regarding weather, traffic, news, sports, current events, breaking stories, commentary, headlines, advertisements, horoscopes, solicitations, financial advice, stocks, markets, events, schools, governments, blog entries, podcasts, and the like. Moreover, overlay content may be provided by any authenticated source, including grassroots groups or individuals, non-profits, governmental organizations, public/private institutions, etc. Further, overlay content may be specific to certain geographic locations or selectively distributed based on user demographics, geography (e.g., zip code), age, gender, orientation, occupation, interests, affiliations, etc. Additionally, overlay content may be generated based on information corresponding to STB users, i.e., overlay content may be tailored to specific individuals or focus groups. In other instances, overlay content may include information proprietary to the service provider, such as a content line up, service subscription options, data about subscribers, and the like. It is noted that overlay content can be any type of information provided from any source having connectivity to system 100.

Moreover, the overlay content may be distinguished (or otherwise categorized) utilizing metadata included therewith or appended thereto. Metadata can be generally considered as data about data; but more specifically, it can be utilized to describe all aspects of, and content distributed by, system 100. Namely, metadata can include descriptions about: data aspects (file name, type, administrator, size, location, version, or include timestamps, mode bits, arbitrary attribute-value pairs, etc.), titles, activities/events, individuals and organizations involved, intended audiences (e.g., ethnicities, ages, genders, incomes, educational levels, disabilities, motilities, as well as other like demographic statistics), geospatial identifications (intended zip codes, school districts, communities, etc.), locations of supplementary information and processes, access methods, limitations, timing of activities/events (e.g., start/end dates), as well as motivations, policies and rules. As such, metadata may be utilized by various components of system 100 for control or guiding purposes.

In particular embodiments, system 100 may structure and encode metadata to describe characteristics of the content-bearing entities to aid in the creation, identification, discovery, assessment, and management of the overlay content. Alternative embodiments may utilize metadata to optimize compression algorithms or perform other computational tasks by the components of system 100. The metadata might be utilized to specify overlay content that is to be presented to a plurality of STBs. Various other embodiments might use metadata to correlate overlay content with user profiles to determine the overlay content that is to be presented to a user. A more detailed explanation of user profiles is provided with respect to FIG. 2.

Accordingly, STBs 105a-105n may communicate with MSPs 107, television broadcast systems 117, or third-party content provider systems 119 via one or more service provider networks 101. These networks 101 may employ various access technologies (including broadband methodologies) including, but certainly not limited to, cable networks, satellite networks, subscriber television networks, digital subscriber line (DSL) networks, optical fiber networks, hybrid fiber-coax networks, worldwide interoperability for microwave access (WiMAX) networks, wireless fidelity (WiFi) networks, other wireless networks (e.g., 3G wireless broadband networks, mobile television networks, radio networks), terrestrial broadcasting networks, provider specific networks (e.g., a Verizon FiOS network, a TiVo network, etc), and the like.

Further, content may be transmitted from (or to) one or more packet based networks 109 and/or telephony networks 121, such as the Internet, various intranets, local area networks (LAN), wide area networks (WAN), the public switched telephony network (PSTN), integrated services digital networks (ISDN), other private packet switched networks or telephony networks, as well as any additional equivalent system or combination thereof. These networks may utilize any suitable protocol supportive of data communications, e.g., transmission control protocol (TCP), internet protocol (IP), file transfer protocol (FTP), telnet, hypertext transfer protocol (HTTP), asynchronous transfer mode (ATM), socket connections, Ethernet, frame relay, and the like, to connect STBs 105a-105n to the various media content sources. In alternative embodiments, STBs 105a-105n may be directly connected to the one or more various media sources, including MSP 107.

Although depicted in FIG. 1 as separate networks, packet-based network 109 and/or telephony network 121 may be completely or partially contained within service provider network 101. For example, service provider network 101 may include facilities to provide for transport of packet-based and/or telephony communications.

In various embodiments, the service provider network 101 may include one or more video processing modules (not shown) for acquiring and transmitting video feeds from television broadcast systems 117 or other third-party content provider systems 119 over one or more of the networks 101, 109, 121 to particular STBs 105a-105n. Accordingly, service provider network 101 may include facilities to support compression/decompression, coding/decoding, modulation/demodulation, optical/electrical conversion, and analog/digital conversion, as well as any other suitable signal processing and/or transmission operation. Further, service provider network 101 can optionally support end-to-end data encryption in conjunction with video streaming services such that only authorized users are able to view content and interact with other legitimate users/sources.

Accordingly, system 100 may include an authentication module (not shown) configured to perform authorization/authentication services and determine whether users or content sources are indeed subscribers to, or providers of, the content overlay service. An authentication schema might require a user name and password, a key access number, a unique machine identifier (e.g., media access control (MAC) address), etc., as well as any combination thereof. Thus, once an STB or content source is authenticated, connections between the STBs 105a-105n and the media content sources may be established directly. Further, the authentication module may grant users the right to receive overlay content concerning one or more geographic communities serviced by system 100 by revoking existing sets of digital certificates associated with a particular community, and issuing new sets of digital certificates mapped to a second community. In this regard, an STB may receive new overlay content concerning the second community, whereas the previous session can be automatically closed when the "old" or prior certificates associated with the first community are revoked. This enables users to initiate secure sessions at any given STB 105a-105n linked to system 100, whether or not the STB belongs to that individual user. It is additionally contemplated that multiple rights sessions may exist concurrently.

In particular embodiments, MSP 107 may comprise an IPTV system configured to support the transmission of television video programs from the broadcast systems 117 as well as other content, such as content overlays, from the third-party content provider systems 119, utilizing Internet Protocol (IP). That is, the IPTV system 107 may deliver video streams, including overlay data, in form of IP packets. Further, the transmission network (e.g., service provider network 101) can optionally support end-to-end data encryption in conjunction with the video streaming services so that only authorized users and sources are permitted to view/transmit the video streams and interact with other legitimate users/sources.

In this manner, the use of IP permits television services to be integrated with broadband Internet services, and thus, share common connections to a user site. Also, IP packets can be more readily manipulated, and therefore, provide users with greater flexibility in terms of control and offers superior methods for increasing the availability of media content including overlay content. Delivery of video content, by way of example, may be through a multicast from the IPTV system 107 to the STBs 105a-105n. Any individual STB may tune to a particular source, e.g., channel, by simply joining a multicast of the video content, utilizing an IP group membership protocol (IGMP). For instance, the IGMP v2 protocol may be employed for joining STBs to new multicast groups. Such a manner of video delivery avoids the need for expensive tuners to view television broadcasts; however, other video delivery methods, such as directly modulated carriers (e.g., national television systems committee (NTSC), advanced television systems committee (ATSC), quadrature amplitude modulation (QAM)), may still be used. It should be noted that conventional delivery methods may still be implemented and combined with the advanced methods of system 100. Also, the video content may be provided to various IP-enabled devices, such as PCs, PDAs, web-appliances, mobile phones, etc.

Accordingly, an STB (e.g., STB 105a) may integrate all the functions of an IPTV system, as well as combine the content overlay functions of the various online or off-line environments, in a manner that seamlessly toggles among the functions. It is contemplated that the overlay content service may be extended to users with a presence on the Internet or retrieve content stored at a database 111 connected the packet based network 109. In alternative embodiments, the information service may be extended to still further users having an end terminal (not shown), such as a plain old telephone service (POTS) device, connected to the telephony network 121. While system 100 is illustrated in FIG. 1, the exemplary components are not intended to be limiting, and indeed, additional or alternative components and/or implementations may be utilized.

Figure 2:
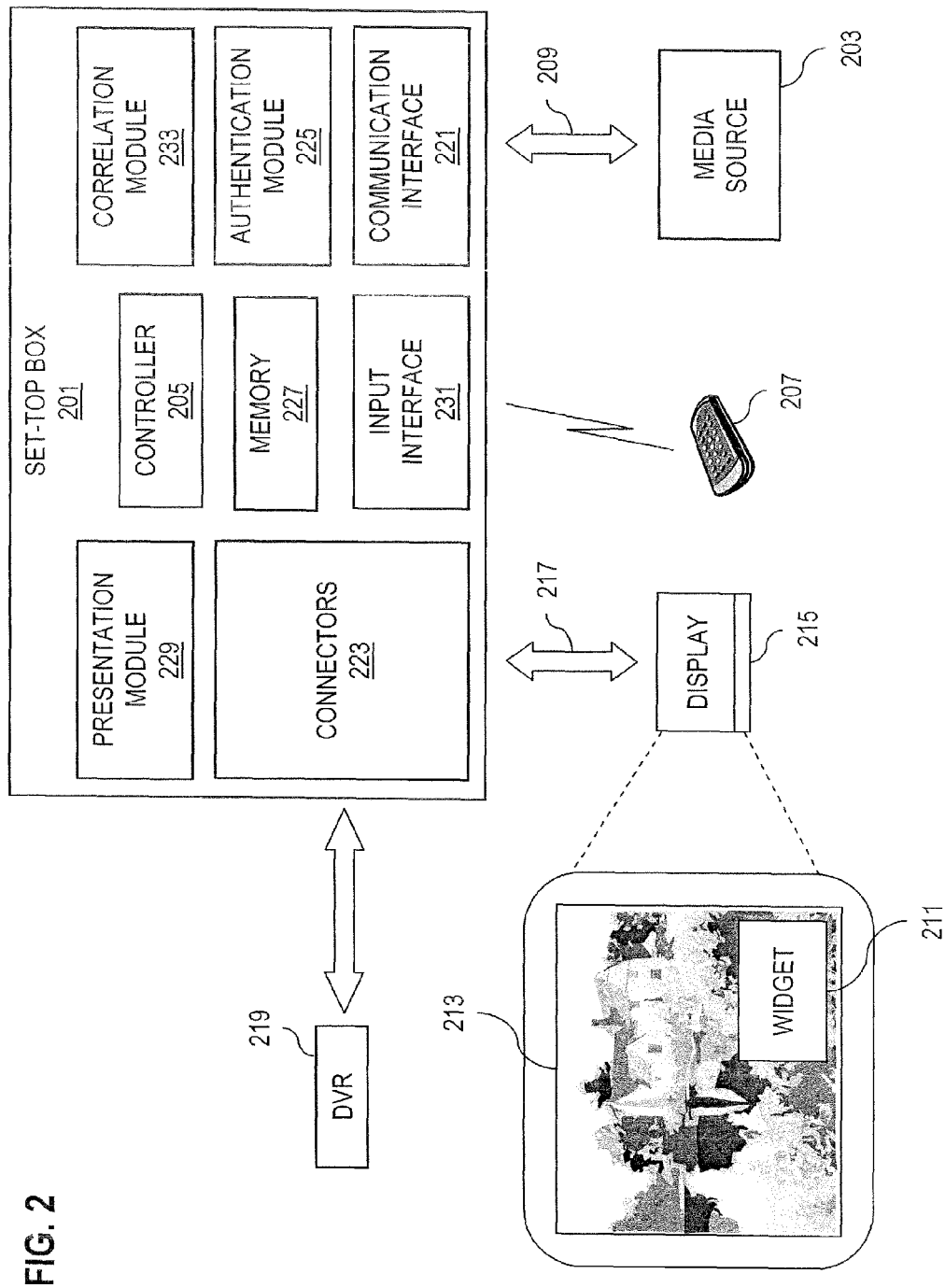
FIG. 2 is a diagram of a set-top box configured to provide widgets, according to an exemplary embodiment.

FIG. 2 is a diagram of a set-top box configured to provide widgets, according to an exemplary embodiment. STB 201 may comprise any suitable technology to receive one or more media content streams, including at least one content overlay instance, from a media source 203, such as the IPTV system of FIG. 1. Accordingly STB 201 may comprise computing hardware (such as described with respect to FIG. 7) and include additional components configured to provide specialized services related to the reception and display of media content and overlay instances (e.g., remote control capabilities, conditional access functions, tuning functions, presentation functions, multiple network interfaces, audio/video signal ports, etc.). Alternatively, the functions and operations of STB 201 may be governed by a controller 205 that interacts with each of the STB components to provide content overlay that is generated based on information corresponding to a user. In turn, a user may be afforded greater functionality utilizing a control device 207 to control these services, as will be more fully described below.

As such, STB 201 may be configured to process a media content stream 209, including causing a displayable application (e.g., widget 211) and/or one or more components of the media content (e.g., video component 213 and/or an audio component) to be presented on (or at) display 215. Presentation of the media content and widget 211 may include: displaying, recording, playing, rewinding, forwarding, toggling, or any other processing technique that enables users to experience media content streams 209. For instance, STB 201 may provide one or more signals 217 to a display 215 (e.g., television) so that the display 215 may present (e.g., display) the media content (e.g., video 213) along with a content overlay instance (e.g., widget 211) to a user.

STB 201 may also interact with a PVR, such as digital video recorder (DVR) 219, to store received signals that can then be manipulated by a user at a later point in time. A display 215 may present content from STB 201 to a user. In alternative embodiments, STB 201 may be configured to communicate with a number of additional peripheral devices (not illustrated), including: PCs, laptops, PDAs, cellular phones, monitors, mobile devices, handheld devices, as well as any other equivalent technology capable of presenting media content to a user. These peripherals may be configured to access media content (including overlay content) stored and/or processed by STB 201. For example, a media content stream 209 may be received by STB 201 and recorded by DVR 219, wherein a PC may later access and view the stored content. Moreover, the peripheral devices may be configured to program or otherwise control the functions of STB 201.

Furthermore, STB 201 may include a communication interface 221 configured to receive media content streams from an MSP 107 or other content source. Communication interface 221 may optionally include single or multiple port interfaces. For example, STB 201 may establish a broadband connection to multiple sources transmitting media content to STB 201 via a single port, whereas in alternative embodiments, multiple ports may be assigned to the one or more sources. In still other embodiments, communication interface 221 may be configured to permit users, via STB 201, to transmit data (including media content and overlay instances) to other users with STBs, an MSP 107, or other content source or sink. An exemplary interface for permitting content sharing using widgets is more fully described with respect to FIG. 4.

According to various embodiments, STB 201 also includes inputs/outputs (e.g., connectors 223) to display 215 and DVR 219, as well as an audio system (not illustrated). The audio system may comprise a conventional audio-video receiver capable of monaural or stereo sound, as well as multichannel surround sound. Further, the audio system may include speakers, ear buds, headphones, or any other suitable component configured for personal or public dissemination. As such, STB 201, display 215, DVR 219, and the audio system, for example, may support high resolution video streams, such as high definition television (HDTV) or digital theater systems high definition (DTS-HD) audio. Therefore, STB 201 may be configured to encapsulate data into a proper format with required credentials before transmitting onto one or more of the networks of FIG. 1 and de-encapsulate incoming traffic to dispatch data to display 215 and/or the audio system.

In an exemplary embodiment, display 215 and/or the audio system may be configured with Internet Protocol (IP) capability (i.e., includes an IP stack, or is otherwise network addressable), such that the functions of STB 201 may be assumed by display 215 and/or the audio system. In this manner, an IP ready, HDTV display or DTS-HD audio system may be directly connected to one or more service provider networks 101, packet-based networks 109, and/or telephony networks 121. Although STB 201, display 215, and DVR 219 are shown separately, it is contemplated that these components, as well as the audio system, may be integrated into a single component, or other combinations of components.

An authentication module 225 may be provided at STB 201 to initiate or respond to authentication schemes of, for instance, service provider network 101 or various other content providers, e.g., third-party content provider systems 119. Authentication module 225 may provide sufficient authentication information, e.g., a user name and password, a key access number, a unique machine identifier (e.g., MAC address), and the like, as well as combinations thereof, to a corresponding network interface for establishing connectivity. As mentioned earlier, one or more digital certificates may be simultaneously mapped. Further, authentication information may be stored locally at memory 227, in a repository (not illustrated) connected to STB 201, or at a remote repository, e.g., user profile repository 111.

Authentication module 225 may also facilitate the reception of media content, as well as overlay content, from single or disparate sources. For instance, STB 201 may receive a video stream from a first source (e.g., IPTV system 107) and overlay content from a second and third source (e.g., content provider systems 119 and content repository 113). As such, display 215 will present the video stream and overlay content to the user, wherein a displayable application (e.g., widget 211) can permit users to experience the overlay content from a litany of sources. This presentation may be experienced separately, concurrently, in a toggled fashion, or with zooming capabilities, or in any other like mode. In other exemplary embodiments, authentication module 225 can authenticate a user to allow them to specify metadata for content of the widget 211 that is to be presented to multiple STBs.

A presentation module 229 may be configured to receive data streams (e.g., video feed(s) and/or overlay content) and output a result via one or more connectors 223 to display 215 and/or the audio system. It is noted that aural aspects of widget 211 may be presented via the audio system and/or display 215. In this manner, a displayable application may be provided by presentation module 229 that is overlaid on video content that is output to the display 215. The overlay content presented therein may be generated based on information corresponding to the STB user.

Connector(s) 223 may provide various physical interfaces to display 215 and the audio system, as well as other peripherals; the physical interfaces may include, for example, RJ45, RJ11, high definition multimedia interface (HDMI), optical, coax, FireWire, wireless, and universal serial bus (USB), or any other suitable connector. The presentation module 229 may also interact with a control device 207 for determining particular media content sources that a user desires to experience. In an exemplary embodiment, the control device 207 may comprise a remote control (or other access device having control capability, such as a PC, wireless device, mobile phone, etc.) that provides a user with the ability to readily manipulate and dynamically change parameters affecting the media content and/or overlay instances being viewed. In other examples, STB 201 may be configured for voice recognition such that STB 201 may be controlled with spoken utterances.

In this manner, the control device 207 may include a cursor controller (not illustrated) and/or key pad (not illustrated) for activating a displayable application, navigating through channels and/or overlay content, as well as performing other control functions. For instance, control device 207 may be utilized to search for overlay content, retrieve additional information, or toggle through previously displayed overlay instances. Further, the control device 207 may comprise a memory (not illustrated) for storing preferences affecting the content viewed, which can be conveyed to STB 201 through an input interface 231. The input interface 231 may support any type of wired and/or wireless link, e.g., infrared, radio frequency (RF), BLUETOOTH, and the like. Thus, control device 207 may store user preferences with respect to overlay content, such as favorite sources, etc. Alternatively, user preferences may be tracked, recorded, or stored in STB 201 or in a network user profile repository 111. The preferences may be automatically retrieved and activated by a user at any time. It is noted that the control device 207 may be separate from STB 201 or may be integrated within STB 201 (in which case certain input interface 231 hardware and/or software may not be necessary).

Particular embodiments enable users, via remote control, to populate or otherwise configure a user profile. For instance, a user profile application may be provided or accessed by STB 201 to enable users to populate a plurality of entry fields with user information. A user profile may include one or more customized or personalized settings that affect any aspect of media content or overlay instance accessible via STB 201. More specifically, the profile may include: subscription information (account number, user name, password, avatar, moniker, etc.), subscriber demographics (age, gender, ethnicity, location of residence, zip code, school district, community, socioeconomic status, religion, marital status, ownerships, languages, mobility, life cycles, etc.), group/organizational affiliations (e.g., political), memberships, interests, buddies, friends, cohorts, system configurations, policies, associated users, etc., as well as any other like personal information. Additionally, a user profile may include a "whitelist" specifying one or more accessible media content and/or overlay content sources/subjects, a "blacklist" specifying one or more media content and/or overlay content sources/subjects, as well as other equivalent customized settings, such as color schemes, active/inactive widgets, display size/position, etc.

In other embodiments, the user profile may be established using the additional access devices mentioned earlier, e.g., PC, PDA, mobile phone, handheld device, etc. As such, user profile information may be stored in STB 201 (e.g., in memory 227) and/or at a user site repository (not illustrated) directly connected to STB 201. Additionally or alternatively, user profile information may be stored within a network, a remote user profile repository 111, the control device 207, and/or any other storage medium.

STB 201 may also include a correlation module 233 configured to correlate the displayable application with the user information to determine the content of the displayable application. For instance, an MSP 107 may provide an exhaustive set of weather forecast overlay instances to their subscribing audience, or a comprehensive traffic report overlay stream. Thus, correlation module 233 may be selectively configured to control which weather forecast overlay instances are accepted at communication interface 221, or what part(s) of the traffic report overlay stream are to be presented by presentation module 229. These policies may be based on various information stored within a user profile, such as zip codes, street addresses, routes to work, communities, specific instructions, etc. In this manner, a user would not be required to wait for a typical PEG channel rotation to acquire the information they desire, it can be made substantially instantaneously available. Further, since a typical PEG rotation can consume an inordinate amount of time, the information might be out-dated. By only permitting desired information, the correlation module 233 can ensure only up-to-date information is presented.

In another example, a third-party content provider system 119 may provide extensive content regarding community events. Meanwhile, a user may only be interested in "town hall meeting" information. A typical PEG channel would consume extensive bandwidth transmitting the entirety of the community events content. The correlation module 233, however, may selectively appraise available overlay content (utilizing overlay content metadata, for instance) to "download" only the "town hall meeting" overlay content for display. Further, if additional information is desired, a user may transmit a request and receive supplemental information via the displayable application utilizing, for instance, control device 207. Since only a limited portion of the community events content is downloaded and since information can be supplemented when necessary, correlation module 233 makes more efficient use of system resources, e.g., bandwidth.

Alternatively, the functions of correlation module 233 may be provided, for instance, by the service provider network 101 or other system 100 component, such as the video processor module. Thus, in the above embodiments, the overlay content may be generated based on a policy or configuration of a user profile stored at a memory or repository accessible by (or resident with) the service provider network 101 or with/at STB 201. Similarly, overlay content may be generated "on-demand" when requested by a user of STB 201.

Moreover, it was noted that conventional PEG channels require full-channel system bandwidth to present relatively low-bandwidth communications, i.e., an entire channel is required to present, for instance, a calendar of community events, Further, PEG presentation is generally to the exclusion of other media content presentations. Conversely, STB 201 may simply overlay the calendar of community events on any video content session (e.g., standard television broadcast, IPTV channel, DVR playback, etc.) utilizing the displayable application to overlay content on video content. As such, STB 201 can more efficiently utilize system resources by enabling bandwidth allocations to be scaled according to the demand of particular overlay content transmissions.

Thus, under arrangements of FIG. 2, a user may receive and transmit content overlay instances, e.g., widgets, while viewing a media content production, such as a television program. For instance, notification of sports coverage, weather forecasts, traffic reports, horoscopes, daily news, commentary, community service information, etc., may be visually provided on display 215, in which a widget 211 "pops-up" to present the overlay content when it becomes available. Alternatively, overlay content may be obtained periodically (based on a predetermined time interval), continuously, or on an "on-demand" basis.

Figure 3B:
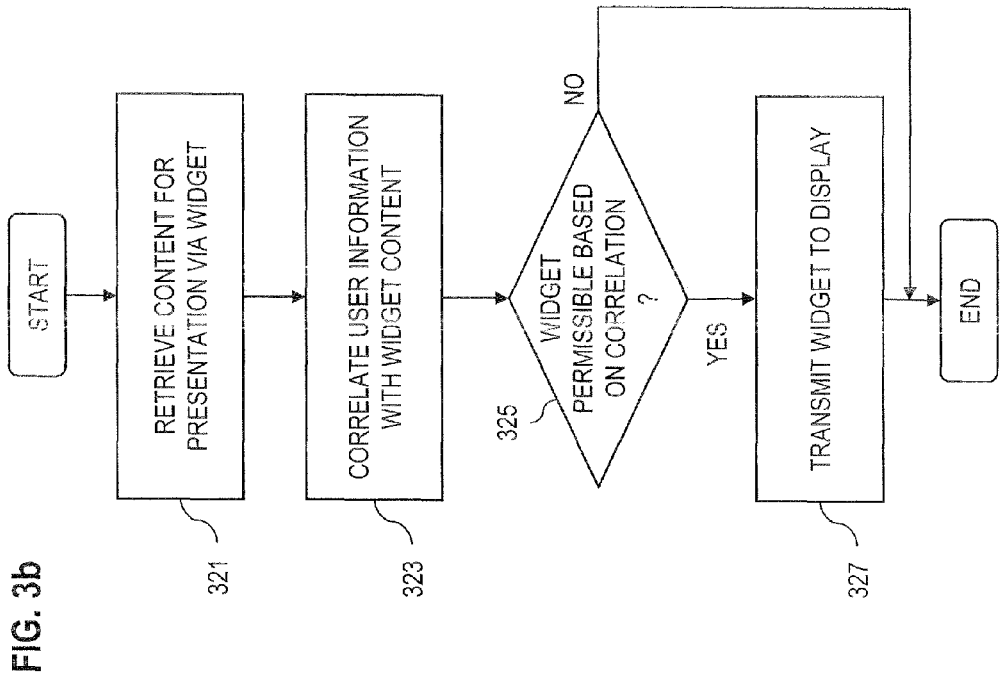
FIGS. 3a and 3b are flowcharts of processes for providing widgets using the set-top box of FIG. 2, according to exemplary embodiments.
Figure 3A:
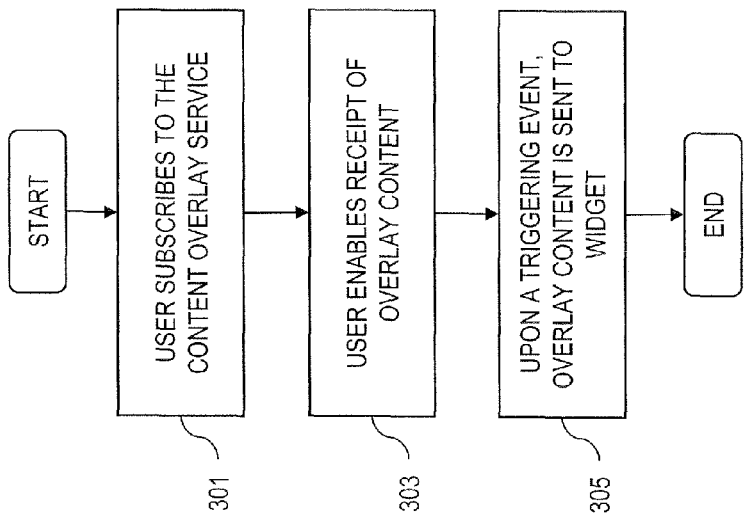

The operation of STB 201 and control device 207 will now be explained with respect to receiving one or more content overlays, e.g., widgets. FIGS. 3a and 3b are flowcharts of processes for providing widgets using the set-top box of FIG. 2, according to exemplary embodiments. In particular, FIG. 3a shows a process for providing pop-up widgets using the set-top box of FIG. 2, according to an exemplary embodiment. In step 301, a new user subscribes to the content overlay service utilizing STB 201 (which is capable of processing multiple video channels or streams). That is, the user can interact with STB 201 using the control device 207 to activate software resident on the STB 201. The software may then establish a connection to the service provider network 101 through an IP based connection. Consequently, the user may register as a new subscriber of the content overlay service, as well as obtain sufficient authentication information for establishing future sessions. Once registered and/or authenticated, the STB 201 may communicate with MSP 107 for customizing a user profile to embody user-defined attributes or policies for search, receiving, and/or generating overlay content to be displayed via widget 211.

After generating a user profile, an MSP 107 may store a list of subscribers to the service, as well as a list of subscriber STB identifiers, authentication information, and user-defined profiles. In step 303, the subscriber may interact, using control device 207, with STB 201 to enable receipt of overlay content at display 215. User indications may include various searching, receiving, or generating parameters, such as: which one or more content sources to receive overlay content from, which policy within a user profile should govern, time limits for transmitting overlay content, allowances for automatic overlay content to be received, other devices to receive overlay content at, etc.

Once the subscriber's account is activated, an MSP 107 may monitor and/or conduct overlay content production and relay resulting overlay content to an STB 201 based upon user information. Further, third-party overlay content sources may provide additional overlay content in a like manner. Thus, upon predefined triggering events (i.e., satisfaction of one or more development or reception conditions), as established within the user-defined profile, the MSP 107 and/or third-party sources may generate, as in step 305, a signal embodying overlay content. The signal can be transmitted to all STBs 105a-105n registered to receive such overlay content. In this regard, the STB 201 may format the overlay content information for display, wherein the formatted overlay content is displayed on the user's display 215, via a "pop-up" widget 211. The content may be correlated to particular information within the user's profile before or after reception at STB 201. The process of correlation will be more fully described with respect to FIG. 3b.

FIG. 3b is a flowchart of a process for providing on-demand widgets using the set-top box of FIG. 2, according to an exemplary embodiment. In step 321, an authenticated subscriber may activate a displayable application (e.g., widget 211) and issue an overlay content request to MSP 107 or other third-party overlay content provider through interaction with STB 201 via control device 207. The user can generate a user-defined notification request concerning one or more subject areas or information topics by selecting (via control device 207) from a list of possible request parameters displayed by the software executing on STB 201. These parameters may include which one or more overlay content sources to search, which user policy should govern, time limits for transmitting overlay content, other devices to receive overlay content at, etc. As soon as the request parameters are finalized, STB 201 issues the request to an overlay content source, e.g., MSP 107. It is contemplated that "batch" requests may be provided, as well as a list of previously issued requests. Further, subscribers may generate their own individualized requests.

In step 323, the overlay content source, e.g., MSP 107, may collect information related to the user's request parameters to formulate a response. The collection of information may contain more data than is necessary. As such, a network-based correlation module can correlate the collected information with user information (utilizing overlay content metadata, data within the user's profile, or parameters within the request) to determine the overlay content that is to be transmitted to STB 201. For instance, the user might have requested a weather forecast. In this instance, the MSP 107 may search for weather forecast content via metadata and receive a plurality of "hits." The network-based correlation module may then extract the user's zip code from the user's profile and refine the search or parse appropriate content from the one or more hits to formulate a response.

Alternatively, correlation may occur at STB 201 via correlation module 223. In this embodiment, the overlay content source, e.g., MSP 107, may transmit a broad response to the user's request. For example, MSP 107 may transmit a weather forecast for the user's domiciliary state, such that multiple user requests may be responded to utilizing a single generalized response. Accordingly, correlation module 233 may then extract the user's zip code from the user's profile based on a policy within the same. The correlation module 233 may then parse the formulated response for a weather forecast relating to the user's zip code, thereby creating a parsed result.

In step 325, the formulated response (or parsed result) may be checked for correlation, i.e., responsiveness to the user's request based on the user's zip code. This may be achieved via one or more of the correlation modules. If the formulated response contains, for instance, a traffic report or a weather forecast for a different zip code, the process will end. In alternative embodiments, the process may revert to step 321 to attempt to formulate (or acquire) a conforming response. If the formulated response (or parsed result) is in fact correlated, then the response will be transmitted to STB 201 (or appropriate STB component). More specifically, the formulated response (or parsed result) will be received by presentation module 229 to be formatted for presentation. In step 327, the formatted overlay content is transmitted to an "on-demand" widget 211 presented on display 215. Widget 211 overlays, for instance, the weather forecast for the user's zip code on, for example, a television program (e.g., an on-demand movie) being viewed by the user.

Figure 4:
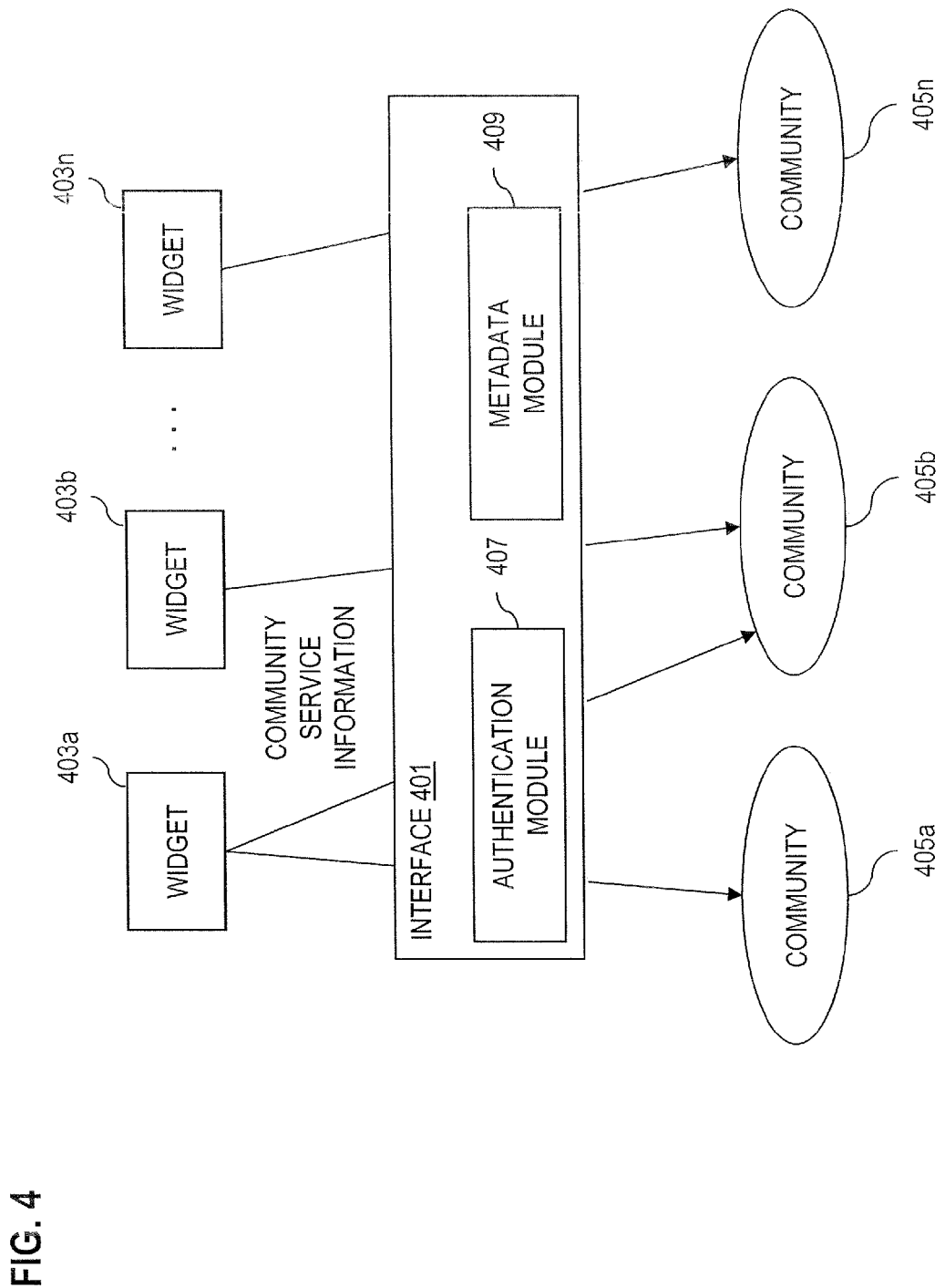
FIG. 4 is diagram of an interface for permitting community groups to share content using widgets, according to various embodiments.

As explained earlier, an overlay content provider, e.g., MSP 107, may formulate generalized responses conforming to the requests of one or more users. As such, users may be grouped or categorized into content-based groups (e.g., users requesting sports coverage about a particular team) or non-content based groups (e.g., geographical groups, such as users living in a similar community). FIG. 4 is diagram of an interface for permitting community groups to share content using widgets, according to various embodiments. It is contemplated that interface 401 may embody many forms and include multiple and/or alternative components.

As depicted, an interface 401 may be included within system 100 to provide user functions for community building, such as permitting community groups to share and/or exchange content using widgets (e.g., 403a-403n) and establishing communications among the various participants. Accordingly, interface 401 may group or categorize users based on similar user information, on overlay content requests, etc. Communities may focus on actions, affinities, circumstances, interests, places, positions, practices, purposes, and the like. For instance, community 405a may be based on similar user information, e.g., a logical mapping of users living in a similar zip code. Community 405b may be based on similar requests, e.g., a logical mapping of users similarly requesting information about "local activities." Meanwhile, community 405n may be established based on other user-provided "ad hoc" demographic information—e.g., a logical mapping of users with similar political affiliations.

An authentication module 407 may provide similar functions to the network authentication module of FIG. 1. Namely, authentication module 407 may be configured to perform authentication services to determine whether users or content sources are members or providers of a particular community 405a-405n. Authentication schemes might require a user name and password, a key access number, a unique machine identifier (e.g., MAC address), etc., as well as any combination thereof. Thus, once an STB or content source is authenticated, connections between STBs (e.g., STBs 105a-105n) of a similar community or between overlay content sources may be established directly. As previously described, multiple rights sessions may exist concurrently or closed and created in a linear fashion. Thus, exemplary embodiments of interface 401 may enable authentication module 407 to authenticate a user to allow them to specify metadata for content of a widget that is to be presented to a plurality of STBs, communities, or members of one or more communities.

In certain embodiments, interface 401 may include a metadata module 409 for generating and providing metadata concerning overlay content that can be searched by STB users of one or more communities 405a-405n. Various other embodiments might utilize metadata module 409 to correlate overlay content with particular members of the one or more communities 405a-405n, i.e., to determine the specific overlay instance that is to be presented to each STB user of the one or more communities 405a-405n. Metadata module 409 may also be used to provide metadata concerning the various communities 405a-405n. Accordingly, STB users may search community related metadata to find groups to join. Thus, embodiments of interface 401 may structure, encode, and provide metadata to describe characteristics of the content-bearing entities to aid in the creation, identification, discovery, assessment, and management of overlay content.

In one particular embodiment, a government (or agency thereof) might utilize interface 401 as a facilitative tool for discussion and engagement of the ordinary citizenry, i.e., as a channel to distribute community-based information apart from market-driven commercial and mainstream media outlets. It is noted that community-based information (or community content) may take on many forms, be applied by to many different groups. By way of example, community content might include: crisis information (e.g., notes about anger management, crime activity, criminal justice data, crisis accommodation, impending disasters, dispute resolution contacts, domestic violence or suicide help, drought warnings, drug/alcohol addiction seminars, finance management tips, general counseling contacts, where to acquire legal aid, etc.), disability information (e.g., available support services/aids/equipment, employment opportunities, programs, activities, etc.), educational information (e.g., school closings, available apprenticeships, resources for the gifted and talented, indigent education opportunities, literacy rates, activities being held at local schools, etc.), financial information (e.g., child support, consumer protection, e-commerce, family budgeting, governmental budgeting, insurance guidelines, retirement income, tax schemes, wages and conditions, etc.), health information (e.g., family planning, pregnancy options, conditions and diseases, major health sites, palliative care, accessing services, etc.), housing information (e.g., tips on maintenance or ownership, services for the indigenous, public housing, renting or leasing opportunities, etc.), multicultural information (e.g., becoming a citizen, language tools, migrant support networks, refugee policies, immigration rules, associations, etc.), parenting information (e.g., adoption, foster care, planning, skills, support networks, public assistance, etc.), political information (e.g., acquiring government data, media releases, voting, elections, legislation, recent amendments, meetings, etc.), work information (e.g., careers, finding employment, local employers, training, unions, volunteering, workplace safety, etc.), news information (weather, sports, fashion, society, entertainment, business, science, cartoon strips, features, lottery numbers, lives of celebrities, advertising, etc.), and community development information (e.g., organizing, building, economics, practice, service, etc.), as well as other like information.

Accordingly, an authorized government agent (e.g., town clerk) may access interface 401 via authentication module 407 to supply select citizenry with community-based information. That is, the clerk can use an end terminal, such as STB 201 or computing hardware 700, to "login" to interface 401 by completing an authentication scheme, e.g., entering a username and password. Community-based information may then be uploaded to interface 401 or identified as located within a networked repository e.g., content repository 113. Metadata module 409 may scan the information and automatically extract or generate metadata describing the content (e.g., affected zip codes, intended audiences, etc.). In particular embodiments, the clerk may augment or supplant these metadata descriptions.

Interface 401 may then correlate the community-based information with particular members of the one or more communities 405a-405n for targeted distribution to STBs 105a-105n. In alternative embodiments, a network correlation module may be provided for this purpose or the clerk may specify a group(s) of STBs (e.g., community 405b) to receive certain information. Overlay content may then be disseminated to one or more STBs. Upon reception, an STB (e.g., STB 201) may utilize a correlation module (e.g., module 233) to further target overlay content to the particular subscriber. As previously described, these correlation processes can be based (in whole or in part) on information stored within a user profile.

As such, generalized widgets may be provided to a plurality of users at one or more communities 405a-405n. For instance, the widget instances 403a-403n may encapsulate overlay content concerning community service information. Widget 403a may concern "school district closings," widget 403b may deal with "local activities," and widget 403n may relate to "town hall meetings." In this manner, community 405a (i.e., users of a similar zip code) may receive widget 403a (i.e., school district closings), community 405b (i.e., users similarly requesting information about "local activities") may receive widgets 403a and 403b (i.e., school district closings and local activities), and community 405n (i.e., users with similar political affiliations) may receive widget 403n (i.e., town hall meetings information). In each instance, a correlation module (e.g., module 233 of FIG. 2) may be utilized for specializing widget presentations at the displays of the community users. In other embodiments, community users may establish voice or other forms of community between communities, users or sources via interface 401.

In other embodiments, STB 201 may enable users to select and control, within a displayable application, display of community service information and/or to retrieve additional information.

Figure 5A:
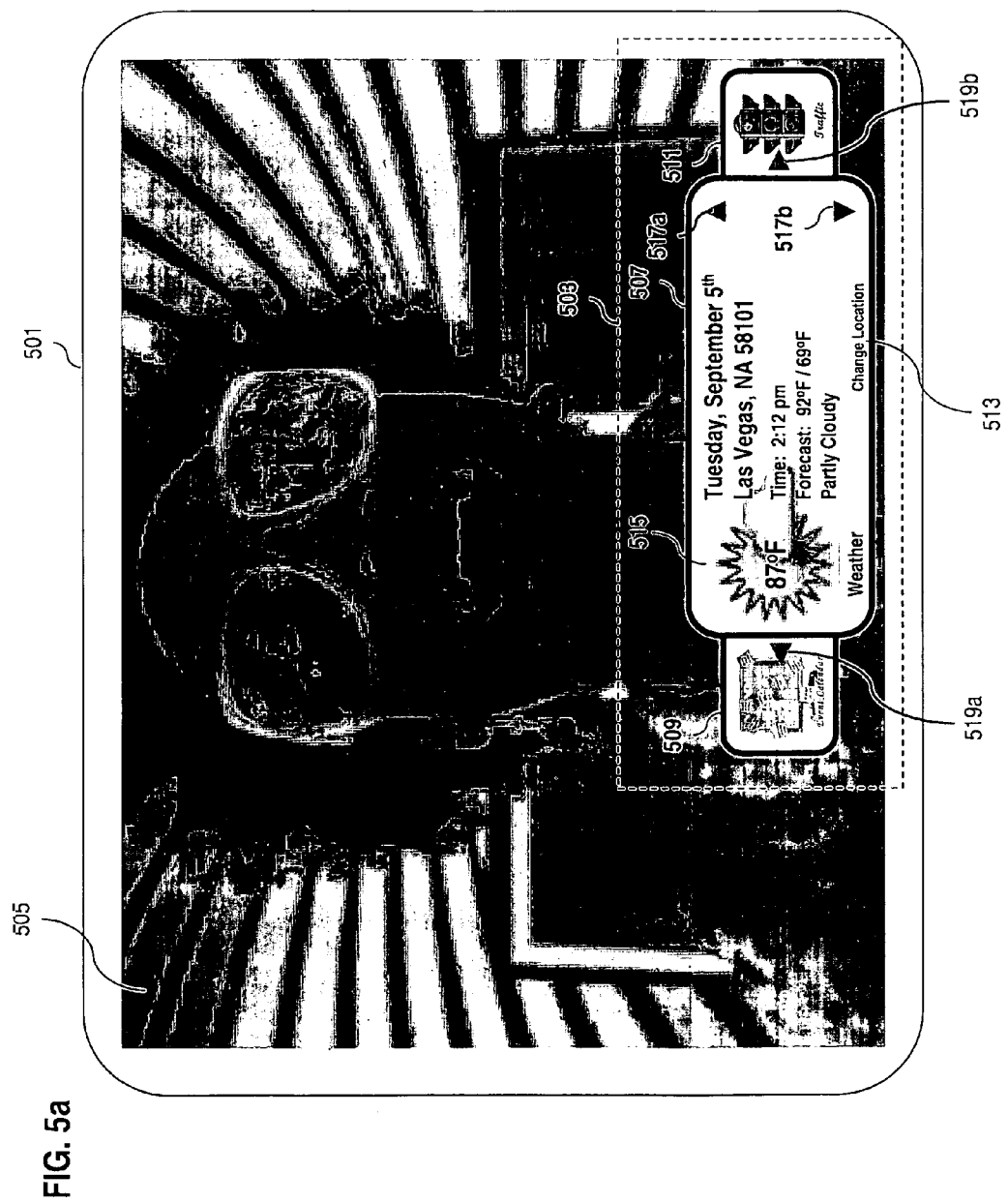
FIGS. 5a-5c are diagrams of television displays providing widgets, according to exemplary embodiments.
Figure 5B:
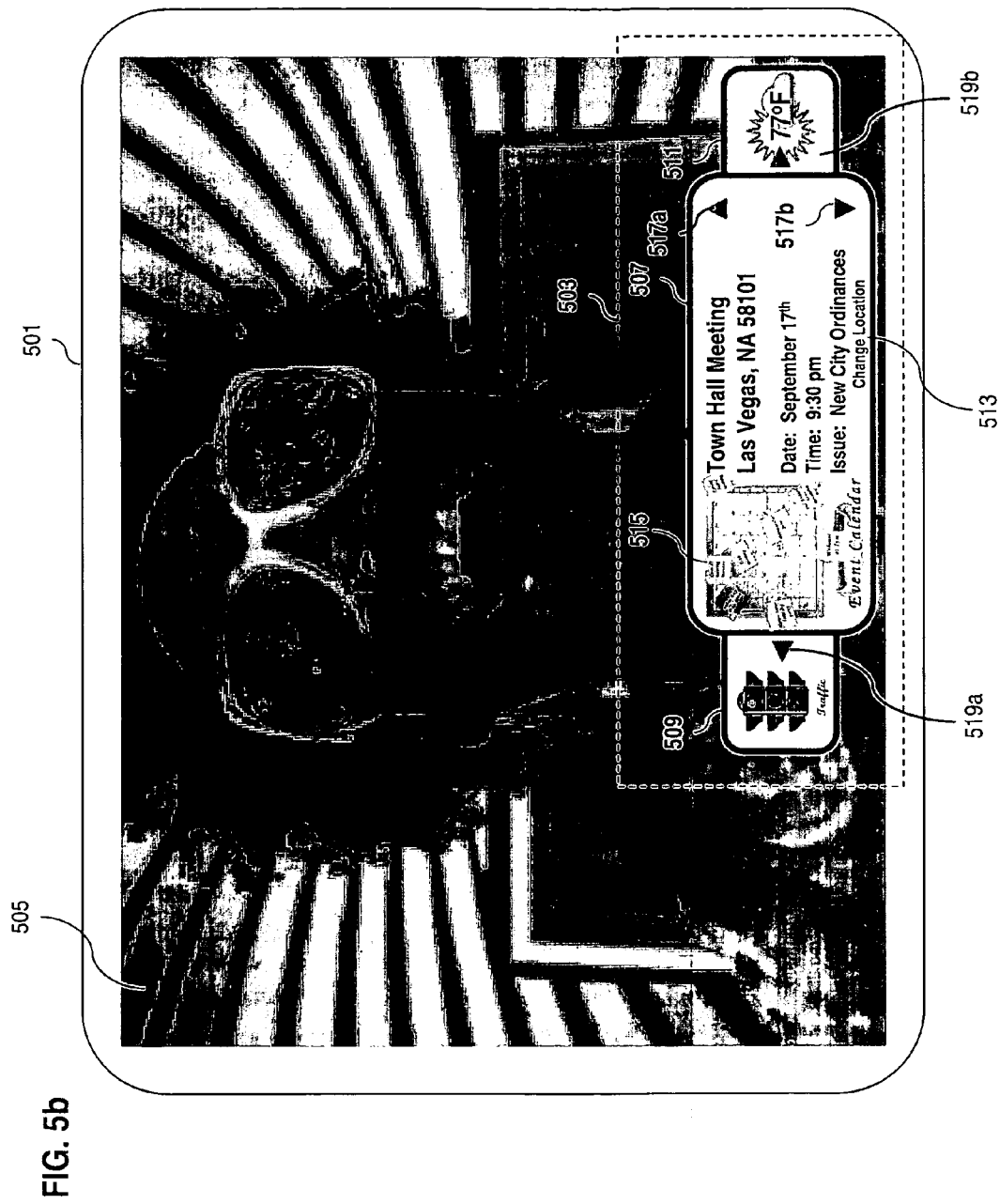
Figure 5C:
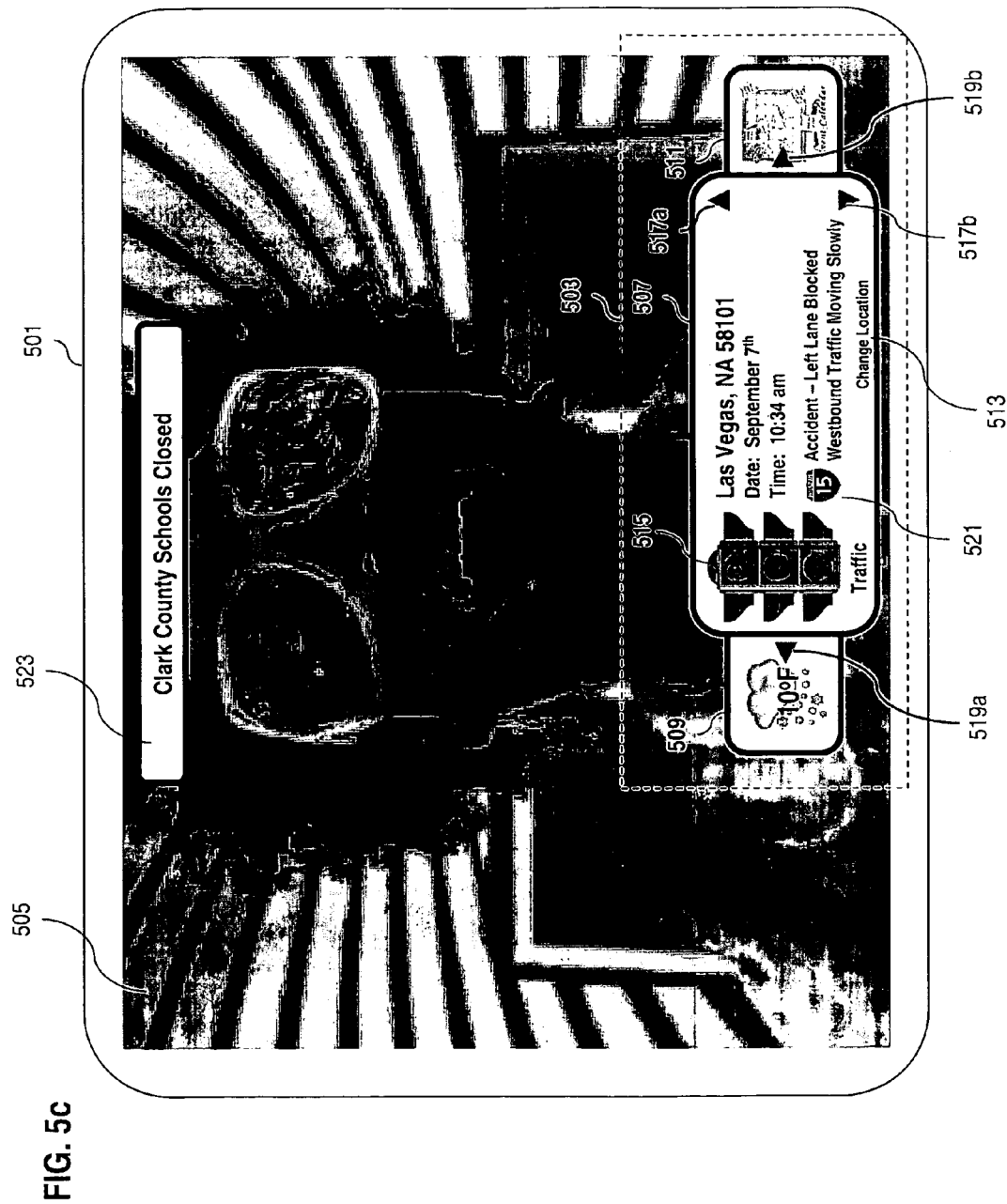

FIGS. 5a-5c are diagrams of television displays providing widgets, according to exemplary embodiments. As seen in FIG. 5a, display 501 includes widget 503 overlaid on video broadcast 505. Widget 505 has main region 507, left region 509, and right region 511. Main region 507 comprises a weather forecast for subscribers of Las Vegas, Nev., the location having been correlated to user profile information, i.e., zip code 58101. A user may change the location via interaction with widget 503. That is, a user may select area 513, input a new zip code, for instance, and acquire a weather forecast for another region. A process for selecting content within a widget is explained in more detail with respect to FIG. 6.

In one embodiment, weather forecast 507 provides a governing location, a date, a current time, and a current forecast including high/low temperatures and sky conditions (i.e., cloud cover, cloud deck, and probability of precipitation). In other embodiments, humidity, wind velocity, wind gust, dew point, pressure, visibility, smog, air pollution ultraviolet rating, ceiling, tide level, water/surf condition, and/or the like may be reported. A graphic element 515 depicts the current forecast conditions. For example, a sun, clouds, rain, or any combination thereof can be shown to indicate respective weather information. In particular embodiments, these graphic elements may be combined as needed to accurately represent the weather and/or toggled between a sun and moon to indicate respective time of day. In those instances when a moon is depicted, an appropriate phase may be provided. Other graphics might depict fog, dust storms, snow, hail, sleet, ice storms, lightening, hurricanes, tornados, and tidal waves, as well as other forms of meteorological phenomena.

In other embodiments, some or all of the graphics of element 515 may be animated; for example, clouds can be shown to move slightly in the wind, in order to indicate wind conditions. Graphic element 515 may also include a current temperature. Widget 503 may use an internal clock of STB 201, or obtain current time information over a network, e.g., service provider network 101. In certain embodiments, widget 503 provides sound effects, for instance, when a user interacts with the overlay instance, e.g., the sound of rain. Main region 507 can also provide warning forecasts (e.g., flash floods, air quality alert, gale force winds, etc.), graphical forecasts, weather maps, radar depictions, etc.

User interaction with navigation icons 517a and 517b can provide additional weather information not shown. Meanwhile, interaction with navigation icons 519a or 519b toggles main region 507 to access "other" overlay instances, such as a traffic report or community-based information. In this manner, left region 509 and right region 511 can present the "next" of a series of overlay instances that may be toggled through. Regions 509 and 511 may be "compressed" presentations. For instance, left region 509 depicts an event calendar graphic to inform the user of a community-based event. An "expanded" community-based event overlay instance is depicted in FIG. 5b. Meanwhile, right region 511 depicts a stoplight graphic to inform the user of a traffic report. An "expanded" traffic report is illustrated in FIG. 5c. In this manner, "compressed" weather forecasts are respectively shown in FIGS. 5b and 5c.

In some embodiments, left region 509 and right region 511 can be "smaller" than main region 507. Additional regions (other than those depicted) may be added and sized appropriately. For instance, a plurality of regions may be aligned in a horizontal, vertical, diagonal, patterned, or cascaded fashion, as well as rotated to a third dimension. Moreover, content providers may tailor graphics to correlate with the content presented by widget 503.

FIGS. 5b and 5c depict widget 503 when a user interacts with navigation icons 519a and 519b. As seen in FIG. 5b, user interaction with widget 503 presents "expanded" community-based information in main region 507. The weather forecast is "compressed" into right region 511. In the depicted embodiment, the forecast compresses to graphic element 515 and a current temperature. The traffic report notification is shown in left region 509. Accordingly, only three overlay instances are available to be experienced by the user. If, for instance, additional overlay instances were available, "new" content would be presented in region 509.

The community-based event provides information regarding a "Town Hall Meeting" correlated for users in Las Vegas, Nev.—zip code 58101. The meeting date, time and issue to be discussed are provided in region 507. The "Change Location" icon 513 may be utilized to access community-based information for other localities. Navigation icons 517a and 517b may toggle through "other" community-based activities for Las Vegas or "other" forms of community-based information correlated to the user's profile. Graphic region 515 depicts a calendar to relay the notion of a "scheduled" event to take place in the future.

Further interaction with navigation icons 519a or 519b presents "expanded" traffic information in main region 507. Left region 509 depicts a "compressed" weather forecast, while right region 511 presents a community-based notification. The traffic report is correlated for users in Las Vegas, Nev.—zip code 58101. A current date, current time, and traffic hotspot report are provided. A graphic element 521 provides effected roadways. Users may interact with the "Change Location" icon 513 to access traffic reports for other localities or roadways. Navigation icons 517a and 517b may toggle through additional traffic reports for other roadways or hotspots. Graphic region 515 depicts a "red" traffic light to relay the notion that traffic is moving slowly. In other embodiments, a "green" light may denote "free-flowing" traffic and a "yellow" traffic light may denote "moderate" congestion.

In other embodiments, the traffic report may comprise an area roadmap having roads colored based on traffic congestion. Particular embodiments may report road construction (current or future), disabled vehicles, number of incidents, roadway debris, disabled bridges, newly constructed roads, closed roads, fuel cost averages, as well as other equivalent traffic/transportation information. Also provided in the depicted embodiment is an urgent overlay instance, e.g., widget 523 presenting community-based information. Namely, widget 523 provides correlated school closings occurring as a result of a rare snowstorm in the subscriber's community, e.g., Clark County. This snowstorm is also reported by "compressed" weather forecast presented in region 509, as well as the current temperature.

Figure 6:
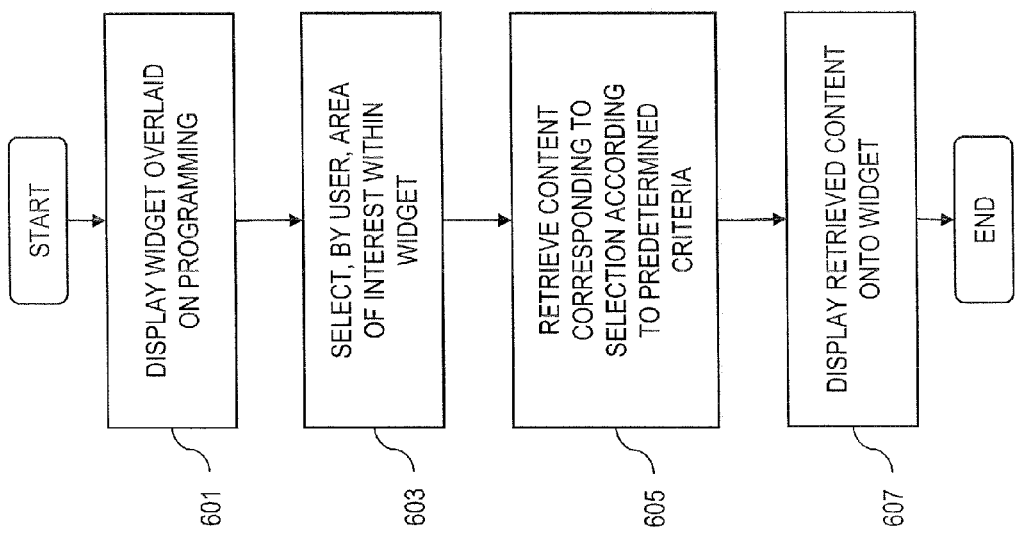
FIG. 6 is a flowchart of a process for selecting content within a widget, according to an exemplary embodiment.

FIG. 6 is a flowchart of a process for selecting content within a widget, according to an exemplary embodiment. In step 601, a media content source (such as MSP 107) provides an STB 201 with media content, such as a broadcast television program. Further, overlay content is either provided directly by MSP 107 or via a third-party source (e.g., content provider system 119). As such, STB 201, via presentation module 229, will cause display 215 to display widget 211 overlaid on the broadcast television program. The user, at this point, may use control device 207 to select an area of interest within widget 211, as in step 603. STB 201, per step 605, communicates the request by the control device 207 to the STB controller 205 to control the display of, for instance, community service information displayed at widget 211. Control commands may include actions, such as: play, pause, stop, fast forward, rewind, zoom, maximize, minimize, and/or other like processes, as well as toggle between overlay content instances or request additional information.

In those instances when additional information is requested by the user, STB 201 (via communication interface 221) communicates the request by the control device 207 to MSP 107, third-party overly content provider system 119, or other overlay content source. According to the response formulation processes described earlier, the overlay content source will formulate a response according to predetermined criteria, e.g., user information within the user's profile. In other words, the response is communicated to MSP 107, for instance, which creates a custom overlay content feed using the appropriate information, and only personalized (or otherwise customized) overlay instances will be delivered to STB 201. In step 607, STB 201 (via presentation module 229) sends the overlay feed to the display 215, namely widget 211, for presentation to the user.

The processes described herein for overlay content reception, transmission, and correlation may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
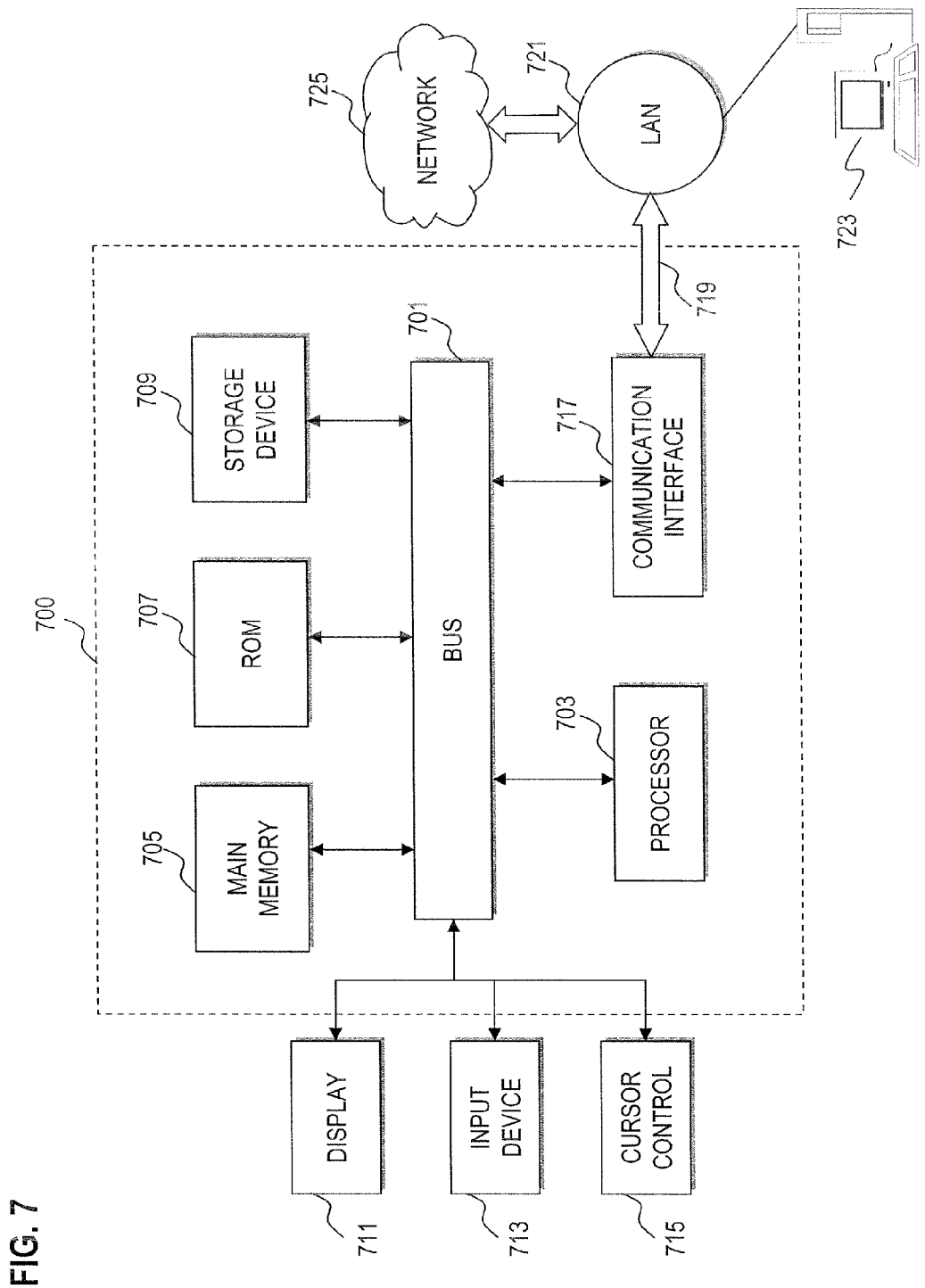
FIG. 7 is a diagram of a computer system that can be used to implement various exemplary embodiments.

FIG. 7 illustrates computing hardware (e.g., computer system) 700 upon which an embodiment according to the invention can be implemented. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
 authenticating a set-top box as being associated with a subscription to a community content overlay service, wherein, in connection with the community content overlay service, content is transmitted to a plurality of set-top boxes via one or more service provider networks, and wherein one or more portions of the content correlate with a community of the set-top boxes based on a respective user profile associated with each set-top box of the community of set-top boxes, wherein the set-top box is further associated with one or more general media broadcasts;
 receiving the content of the one or more general media broadcasts and the community content overlay service transmitted via the one or more service provider networks; and
 generating, by the set-top box, a displayable application for presenting the portions of the received content, wherein the portions of the content are determined based on the correlations between the received content and the respective user profile associated with the set-top box, wherein the displayable application is configured to be presented as an overlay over video content being presented during a viewing of the one or more general media broadcasts and wherein the community of set-top boxes are permitted to share and/or exchange the received content using the displayable application and the overlay is based, at least in part, on metadata searchable and extractable by the plurality of set-top boxes.

2. A method according to claim 1, wherein the correlations are determined by one or more of the set-top box or a network element of a service provider corresponding to the set-top box, and wherein the correlations between the received content and the respective user profile associated with the set-top box are determined after reception of the content at the set-top box.

3. A method according to claim 1, wherein each user profile includes one or more of geographic information, demographic information, government affiliations, community affiliations, and community interests.

4. A method according to claim 1, wherein the content transmitted to the set-top boxes comprises one or more of weather, traffic, news, sports information, stock market information, community information, governmental information, political information, religious information, occupational information, and advertisements.

5. A method according to claim 1, further comprising:
 receiving input from a user of the set-top box to activate the displayable application.

6. A method according to claim 1, wherein the content transmitted to the set-top boxes comprises community service information, the method further comprising:
 receiving input from a user of the set-top box to control, within the displayable application, presentation of the community service information or retrieval of additional information.

7. A method according to claim 1, further comprising:
 providing, by the set-top box, metadata specified by a user for determining content to be provided to other of the plurality of set-top boxes; and
 presenting, via a one of the other set-top boxes, a displayable application providing portions of the content determined by the metadata, wherein the portions of the content are determined based on correlations between the portions of the content and the respective user profile associated with the one set-top box.

8. A set-top box apparatus comprising:
 a receiver module configured to receive content associated with one or more general media broadcasts and a community content overlay service, wherein, in connection with the community content overlay service the content is transmitted to a plurality of set-top boxes via one or more service provider networks, and wherein one or more portions of the content correlate with a community of the set-top boxes based on a respective user profile associated with each set-top box of the community of set-top boxes;

a presentation module configured to generate a displayable application for presenting the portions of the received content, wherein the set-top box apparatus is authenticated as being associated with a subscription to the community content overlay service and is further associated with the one or more general media broadcasts, wherein the portions of the content are determined based on the correlations between the received content and the respective user profile associated with the set-top box apparatus, wherein the displayable application is configured to be presented as an overlay over video content being presented during a viewing of the one or more general media broadcasts, and wherein the community of set-top boxes are permitted to share and/or exchange the received content using the displayable application and the overlay is based, at least in part, on metadata searchable and extractable by the plurality of set-top boxes.

9. An apparatus according to claim 8, wherein the correlations are determined by one or more of the set-top box apparatus or a network element of a service provider corresponding to the set-top box apparatus.

10. An apparatus according to claim 8, wherein each user profile includes one or more of geographic information, demographic information, government affiliations, community affiliations, and community interests.

11. An apparatus according to claim 8, wherein the content transmitted to the set-top boxes comprises one or more of weather, traffic, news, sports information, stock market information, community information, governmental information, political information, religious information, occupational information, and advertisements.

12. An apparatus according to claim 8, further comprising:
an input interface configured to receive an input from a user of the set-top box apparatus to activate the displayable application.

13. An apparatus according to claim 8, wherein the content transmitted to the set-top boxes comprises community service information, the apparatus further comprising:
an input interface configured to receive input from a user of the set-top box apparatus to control, within the displayable application, presentation of the community service information or retrieval of additional information.

14. An apparatus according to claim 7, further comprising:
a metadata module configured to provide metadata specified by a user of the set-top box apparatus for determining content provided to other set-top boxes.

15. A method comprising:
transmitting one or more general media broadcasts and community content to a plurality of set-top boxes, wherein the community content is provided via one or more service provider networks in connection with a community content overlay service, and one or more portions of the community content correlate with a community of the set-top boxes based on a respective user profile associated with each set-top box of the community of set-top boxes, the community content including one or more of public information, educational information, and governmental information, wherein at least a one of the set-top boxes is authenticated as being associated with a subscription to the community content overlay service and is further associated with the one or more general media broadcasts;

generating, by the at least one of the set-top boxes, a displayable application for presenting the portions of the received community content, wherein the portions of the community content are determined based on the correlations between the received community content and the respective user profile associated with the at least one of the set-top boxes, wherein the displayable application is configured to be presented as an overlay over video content being presented during a viewing of the one or more general media broadcasts and wherein the community of set-top boxes are permitted to share and/or exchange the received content using the displayable application and the overlay is based, at least in part, on metadata searchable and extractable by the plurality of set-top boxes.

16. A method of claim 15, wherein each user profile includes one or more of geographic information, demographic information, government affiliations, community affiliations, and community interests.

17. A method of claim 15, wherein the one or more service provider networks include public, educational, or governmental media networks.

18. A method of claim 15, further comprising:
providing, by the at least one of the set-top boxes, metadata specified by a user of the set-top box for determining community content to be provided to one or more other of the set-top boxes.

19. A method of claim 18, further comprising:
retrieving a user profile of the user including the metadata specified by the user,
wherein the correlations are based at least in part on the metadata specified by the user, or to a policy within the user profile of the user.

20. A method of claim 15, wherein the correlations are based at least in part on metadata of the one or more service provider networks and information within the respective user profile associated with the at least one of the set-top boxes.

21. A method of claim 15, wherein the community content is received from a first source and the video content is received from a second source.

22. A system comprising:
one or more media devices configured to transmit one or more general media broadcasts community content provided via one or more service provider networks in connection with a community content overlay service;
a plurality of set-top boxes each configured to receive the community content,
wherein one or more portions of the community content correlate with a community of the set-top boxes based on a respective user profile associated with each set-top box of the community of set-top boxes, the community content including one or more of public information, educational information, and governmental information,
wherein at least a one of the set-top boxes is authenticated as being associated with a subscription to the community content overlay service and is associated with the one or more general media broadcasts,
wherein the at least one of the set-top boxes is further configured to generate a displayable application for presenting the portions of the received community content,
wherein the portions of the community content are determined based on the correlations between the received community content and the respective user profile associated with the at least one of the set-top boxes, wherein the displayable application is configured to be presented as an overlay over a video content being presented during a viewing of the one or more general media broadcasts and wherein the community of set-top boxes are permitted to share and/or exchange the received content using the displayable application and the overlay is based, at least in part, on metadata searchable and extractable by the plurality of set-top boxes.

23. A system of claim 22, wherein each user profile includes one or more of geographic information, or demographic information, government affiliations, community affiliations, and community interests.

24. A system of claim 22, wherein the at least one of the set-top boxes is further configured to provide metadata specified by a user of the set-top box for determining community content to be provided to one or more other of the set-top boxes.

25. A system of claim 24, wherein the respective user profile of the at least of the set-top boxes includes the metadata specified by the user and a user defined policy, and the correlations are based at least in part on the one or more of the metadata and the policy.

26. A system of claim 22, wherein the correlations are based at least in part on metadata of the one or more service provider networks and information within the respective user profiles.

27. A system of claim 22, wherein the one or more service provider networks include public, educational, or governmental media networks.

28. A system of claim 27, wherein the video content is provided by a third-party content provider.

29. A method according to claim 1, wherein the content is transmitted to the set-top box upon one or more triggers comprising one or more triggering events predefined pursuant to the respective user profile associated with the set-top box.

30. A method according to claim 29, wherein the one or more triggers further comprise a user-defined request indicating one or more desired topics and/or one or more parameters regarding the content and the displayable application.

31. An apparatus according to claim 8, wherein the content is transmitted to the set-top box apparatus upon one or more triggers comprising one or more triggering events predefined pursuant to the respective user profile associated with the set-top box apparatus.

32. An apparatus according to claim 31, wherein the one or more triggers further comprise a user-defined request indicating one or more desired topics and/or one or more parameters regarding the content and the displayable application.

33. A method according to claim 15, wherein the community content is transmitted to the at least one of the one or more set-top boxes upon one or more triggers comprising one or more triggering events predefined pursuant to the respective user profile associated with the at least one of the one or more set-top boxes.

34. A method according to claim 33, wherein the one or more triggers further comprise a user-defined request indicating one or more desired topics and/or one or more parameters regarding the content and the displayable application.

35. A method according to claim 22, wherein the community content is transmitted to the at least one of the one or more set-top boxes upon one or more triggers comprising one or more triggering events predefined pursuant to the respective user profile associated with the at least one of the one or more set-top boxes.

36. A method according to claim 35, wherein the one or more triggers further comprise a user-defined request indicating one or more desired topics and/or one or more parameters regarding the content and the displayable application.

* * * * *